United States Patent [19]
Wainwright

[11] Patent Number: 5,497,369
[45] Date of Patent: Mar. 5, 1996

[54] MULTICAST SWITCH CIRCUITS

[75] Inventor: Nicholas J. Wainwright, Bristol, England

[73] Assignee: Hewlett-Packard Company, Palo Alto, Calif.

[21] Appl. No.: 30,390

[22] PCT Filed: Oct. 31, 1991

[86] PCT No.: PCT/GB91/01909

§ 371 Date: Apr. 8, 1993

§ 102(e) Date: Apr. 8, 1993

[87] PCT Pub. No.: WO92/08306

PCT Pub. Date: May 14, 1992

[30] Foreign Application Priority Data

Nov. 6, 1990 [EP] European Pat. Off. ............. 90312134

[51] Int. Cl.$^6$ .................................................. H04L 12/56
[52] U.S. Cl. .............................................. 370/60; 340/825.8
[58] Field of Search ............................ 370/60, 60.1, 61, 370/94.1, 58.1, 85.2, 85.1, 85.3, 85.6, 94.2, 94.3, 53, 54, 55, 56, 63, 64, 65, 65.5, 66, 68, 68.1; 340/825.79, 825.8, 825.5, 825.51, 825.08

[56] References Cited

U.S. PATENT DOCUMENTS

| | | | |
|---|---|---|---|
| 4,734,907 | 3/1988 | Turner | 370/60 |
| 4,813,038 | 3/1989 | Lee | 370/60 |
| 4,866,702 | 9/1989 | Shimizu et al. | 370/85.6 |
| 4,932,020 | 6/1990 | Pashan et al. | 370/60 |
| 5,179,551 | 1/1993 | Turner | 370/60 |
| 5,258,752 | 11/1993 | Fukaya et al. | 370/60 |

FOREIGN PATENT DOCUMENTS

| | | |
|---|---|---|
| 0336302 | 10/1989 | European Pat. Off. . |
| 0336300 | 10/1989 | European Pat. Off. . |
| 0336301 | 10/1989 | European Pat. Off. . |
| 0370510 | 5/1990 | European Pat. Off. . |

OTHER PUBLICATIONS

A survey of Fast Packet Switches, by Andrew R. Jacob, Computer Communication Review, vol. 20, No. 1, pp. 54–64, Jan. 1990.

*Primary Examiner*—Benedict V. Safourek
*Assistant Examiner*—Dang Ton

[57] ABSTRACT

A multicast switch fabric is described wherein blocking of desired signal paths is handled by storing a cell to be transmitted through the fabric at a buffer at an input port to the fabric and attempting to retransmit the cell through the fabric until the cell is successfully transmitted, or a maximum number of retries at transmission is reached. Each switch element in the fabric has a block register which stores information as to whether or not a request path including that element is blocked, the block signals being fed back to the input port to indicate whether or not cell transmission has been successful. A 2×2 switch element is described wherein header information from the cell is decoded in two subfields, one field determining the number of copies to be replicated in the switch and a second field determining if the cell is to be fully replicated at each subsequent stage of the fabric.

15 Claims, 12 Drawing Sheets

MULTICAST SWITCH CIRCUITS

TECHNICAL FIELD

This invention relates to multicast switch circuits for use in packet switches operating to transfer data in an asynchronous transfer mode (ATM) network.

With the arrival of optical fibre communication links, broadband packet networks are required to handle and transfer packets of information such as data, voice, and video at high speed from multiple inputs to multiple outputs. Multicast packet switches can be employed in such networks and may consist of two parts—a multicast fabric wherein the number of copies of a packet are created from a single input packet, and a routing fabric wherein the required number of packets as produced by the multicast fabric are received and directed to the correct output addresses.

BACKGROUND ART

Various multicast packet switches have been proposed in the past, for example those by J. S. Turner (IEEE Transactions on Communications, 36, no. 6, June 1988, pp.734–743) and T. T. Lee (IEEE Journal on Selected Areas in Communications, 6, no. 9, December 1988, pp.1455–1467). Such switches are normally modular in design and are intended for implementation on a large scale, coupled for example in a delta network, so as to enable large numbers of inputs/outputs to be handled.

A problem with such multicast fabrics is how to handle contention at nodes within the fabric, where collisions can occur between cells (packets) contending for the same paths within the fabric. Blocking arises when a cell is unsuccessful in gaining control of a suitable path through the fabric. A means must be provided for enabling the cell to retry transmission so as to complete its passage through the switches. Lee (ibid) describes a particular form of non-blocking multicast circuit, whereas Turner (ibid) handles blocking by providing buffers for the cells at the nodes within the multicast fabric and which hold the cells until a successful retry in transmission through further nodes in the fabric can be made.

The present invention is concerned with switches for multicast fabrics which handle cell replication and blocking in a novel way. They can be produced cheaply in small gate arrays, and therefore are suitable for production in modular form to enable multi-input/output packet switches to be produced.

DISCLOSURE OF THE INVENTION

According to the invention there is provided a multicast switch element suitable for connection to a plurality of similar such elements in a matrix to form a multicast switch fabric, said element having a plurality of inputs and a plurality of outputs and a switch therebetween for passing through to the outputs cells of information received at the inputs and for replicating copies of the cell information in accordance with instructions associated with the cell information, and means associated with the switch for decoding said instructions in two sections: one section determining the number of times the cell information is to be replicated within the switch, and the other section determining whether or not the cell is to be replicated fully in any subsequent switch elements to which the element may be connected in the multicast switch fabric.

According to the invention there is also provided a multicast switch fabric having an M×M matrix of connected switch elements as specified in the preceding paragraph, an input port and an output port associated with each input and output respectively of the fabric, each said input port having an input buffer for storing a cell for transmission through the fabric and means for retaining any such cell in said buffer until cell transmission is successful.

Preferably the switch element is constructed as a small modular unit, e.g. as a 2×2 switch, which can be coupled with many similar elements to form a matrix such as a delta network.

In accordance with the invention the incoming cell is buffered at an input port of the multicast fabric where it remains until the cell can be successfully transmitted through the network of switch elements, or until a maximum number of retries at transmission is reached. A succession of attempts is made to set up the appropriate path through the fabric. If this cannot be achieved in any one cycle (as a consequence of blocking occurring) then a blocking signal is fed back to the input port from the blocked node in the network. Each switch element preferably has its own blocking register to store information as to whether it, itself, is blocking an incoming cell or if there is another switch element downstream in the attempted transmission path which is blocking the transmission.

BRIEF DESCRIPTION OF THE DRAWINGS

Preferred features of the invention will now be described by way of example, with reference to the accompanying drawings, in which.

BEST MODE FOR CARRYING OUT THE INVENTION, & INDUSTRIAL APPLICABILITY

Figure 1:
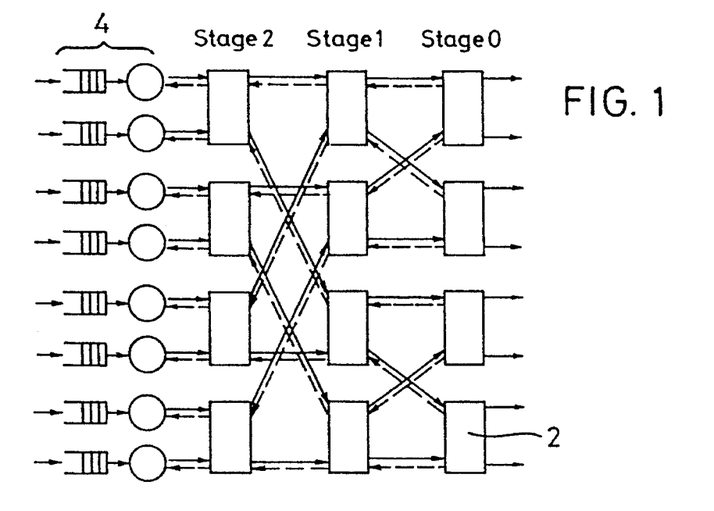
FIG. 1 is an illustration of a simple multicast switch fabric according to the invention in generalised form.

Referring to FIG. 1, the multicast fabric is an input-buffered delta network comprising S stages (3 stages as illustrated) of M×M multicast switch elements 2, where $M=2^m$, m being an integer-1 as illustrated. At each input port, an input port controller 4 buffers incoming cells and submits them to the switch fabric in sequence. The latter operates cell synchronously so that all controllers are synchronised to present cells to the fabric simultaneously. The switch elements 2 are unbuffered and operate in two phases: a set-up phase during which the switch elements interpret cell header information and try to set up a path from the input ports to one or more output ports, and a data phase during which the data is transferred across the previously established paths to the switch fabric outputs. The data paths between the switch elements are shown in solid lines, whereas the feedback paths (the blocking signals) are shown by dotted lines.

Figure 2:
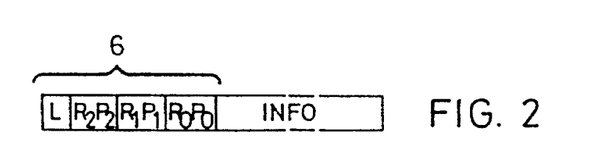
FIG. 2 illustrates the format of a packet or cell as employed in the present invention.

Referring to FIG. 2, each cell or packet has a header 6 which includes a copy control field which defines the number of times the cell must be duplicated as it passes through the switch fabric. Each element 2 in the switch fabric interprets the copy control fields of the cells that arrive at its inputs, sets up a path from the input to one or more of its outputs, and modifies the copy control field of each cell that appears at its outputs to reflect the number of times that it must be duplicated by the following stages in the switch fabric. The copy control field consists of the desired number of copies, $C_s$, encoded as s pairs of subfields, $[R_s, P_s]$. As a cell proceeds through the switch the copy control field is stripped from the cell, stage by stage, to ensure that the subfield for a given stage is always at the head of the cell when it arrives.

Consider a switch element at stage s. Each of its outputs are connected to a switch element at stage s-1. The number of switch fabric outputs that can be reached from each of its outputs is $M^s$. In the multicast switch this represents the maximum number of copies that can be made of a cell appearing at the output of a switch element by the following stages of the fabric. On entry to a switch element at stage s, the $R_s$ (replicate) subfield defines the number of cells that must be fully replicated at its outputs (i.e. cells that should be copied to every switch fabric output that may be reached from the stage to its right). These cells will produce a total of $R_s M^s$ cells at the outputs of the switch fabric.

The $P_s$ (pass-through) subfield defines whether a copy of the cell should also be passed through with its cell header unchanged. This is in addition to the cells that appear at the switch element outputs for full replication by subsequent stages.

On entry to a switch element at stage s:

$$C=R_{s-1}M^{s-1}+R_{s-2}M^{s-2}+\ldots+R_1M+R_0$$

$P_s=1$ if the replicate field for any of the subsequent stages, $R_{s-1}$ to $R_0$, is non zero, and is set to zero otherwise.

Figure 3:
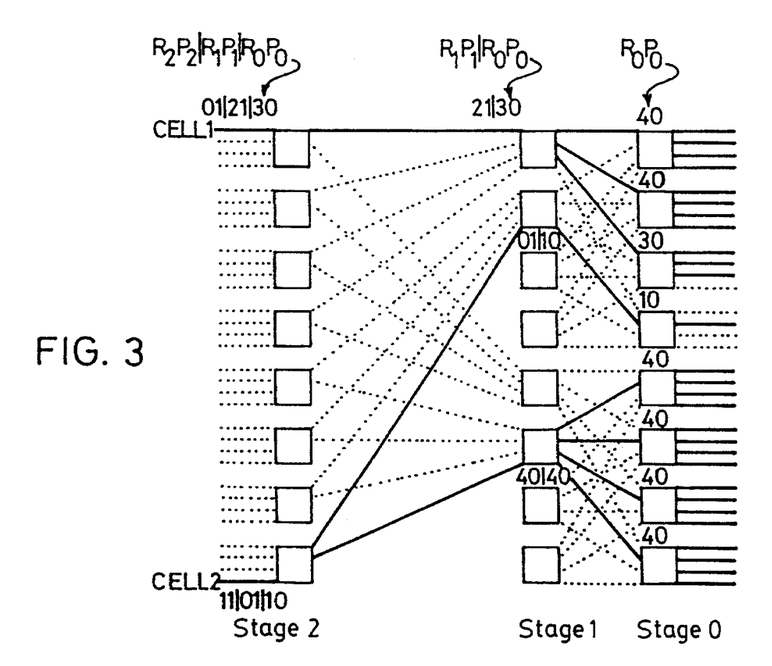
FIG. 3 illustrates generally how a cell, as in FIG. 2, is switched through the multicast switch fabric of FIG. 1.

FIG. 3 illustrates how a cell is routed through a three stage network of 4 port elements (for simplicity, only the top half of the network is shown). Eleven copies of Cell 1 are to appear at the switch fabric outputs. At stage 2 (the first stage) $R_2=0$, $P_2=1$, and the cell is passed through unchanged, losing its copy control field for stage 2 on the way. At stage 1, $R_1=2$ and $P_1=1$, the cell is again passed unchanged and an addition two copies of the cell are produced, each with $R_0=4$ to ensure full replication in the final stage. At the last stage, a total of eleven copies of the cell are produced. In the same example, cell 2 requires 17 copies. At the first stage, $R_2=1$ and $P_2=1$, producing one fully replicated cell that goes on to produce a total of 16 copies plus one cell that passes through the rest of the fabric to produce the 17th cell. Note that after the first stage, the cells that are to be fully replicated have the subfields in the copy control field changed (or "forced") to 4,0, to ensure 4 copies are produced at each subsequent switch element.

Figure 4:
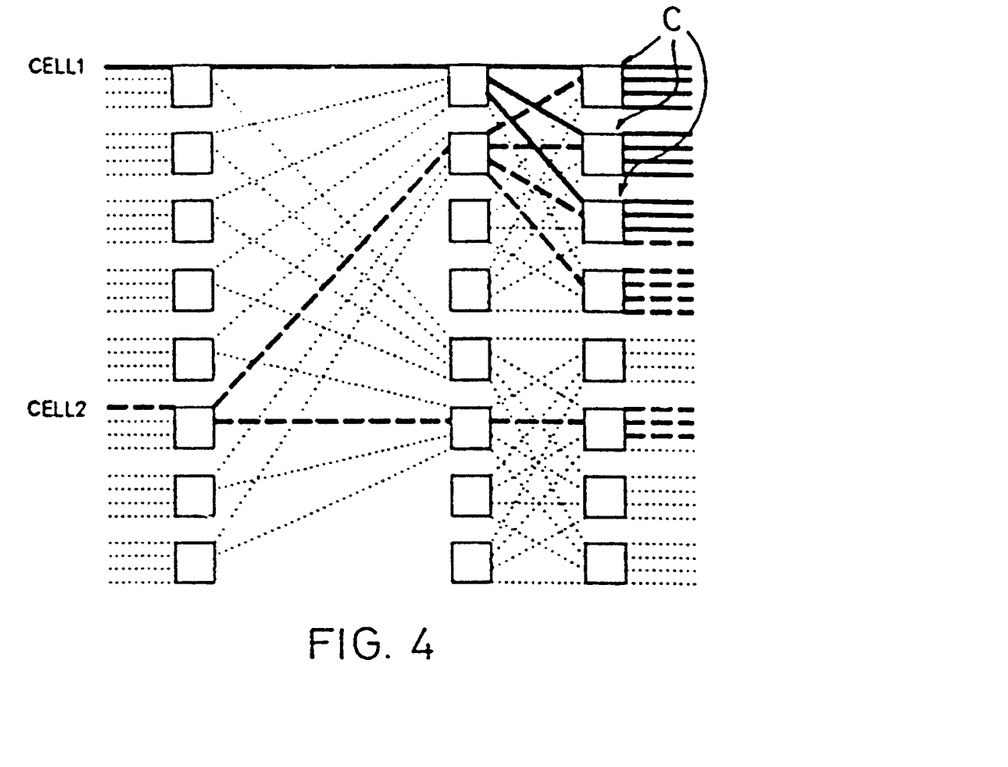
FIGS. 4 and 5 illustrate cell blocking and cell resubmission in the multicast switch fabric according to the invention.
Figure 5:
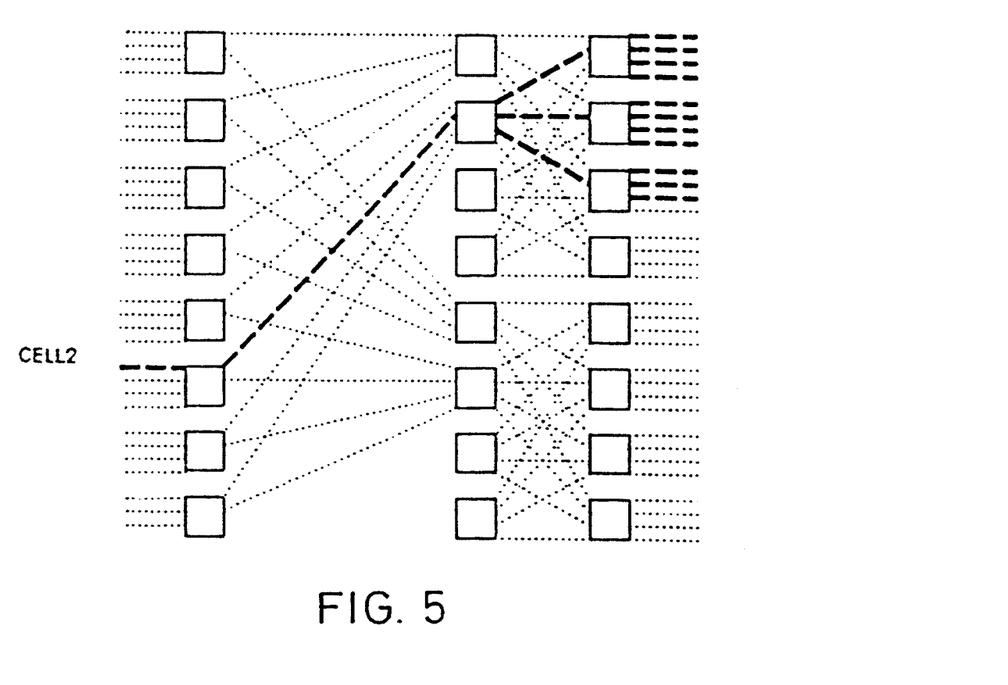

The multicast switch fabric as described is a blocking network where collisions can occur between cells contending for the same paths within the fabric. FIGS. 4 and 5 explain how the circuit of the invention handles such blocking and how resubmission of blocked cells arises to enable a subsequent successful transmission to occur. Referring to FIG. 4, cell 1 successfully produces 11 copies, but this time cell 2 starts at a different input to the fabric and its path results in collisions, C, with cell 1 at 11 of the outputs that it needs in the final stage. If the fabric only allowed cells that were successful on all paths to produce output cells, the performance of the fabric would be poor. This problem is addressed in a buffered fabric such as Turner (ibid) by storing cells within the fabric where the blocking occurred and retrying the cell when the blocked output becomes clear. Without buffering within the network, some other technique must be employed to ensure reasonable performance.

In accordance with the invention the performance of the unbuffered multicast fabric is improved by allowing any successful path to produce output cells even when some branches of the paths are blocked. The state of unsuccessful paths is preserved within the fabric. Any cell that is blocked on one or more paths is resubmitted by the input port controller to allow previously blocked paths to complete. This maximises the number of cells that can be output in any cycle. This is illustrated in FIG. 5.

The input port controller can limit the maximum of times a cell is submitted to the fabric. An extra flag, the L, last-attempt flag can be added to the copy control field to indicate that a cell is being submitted for the last time. When a cell with the L flag set passes through the fabric, the switch elements release all paths for that cell, blocked or otherwise.

The multicast switch element feeds the results of contention for outputs back to the preceding stage. The feedback path indicates whether a cell presented at a switch element input has been blocked on any of its required paths. Blocking can occur either internally within the switch element or at a subsequent stage in the fabric.

Figure 6:
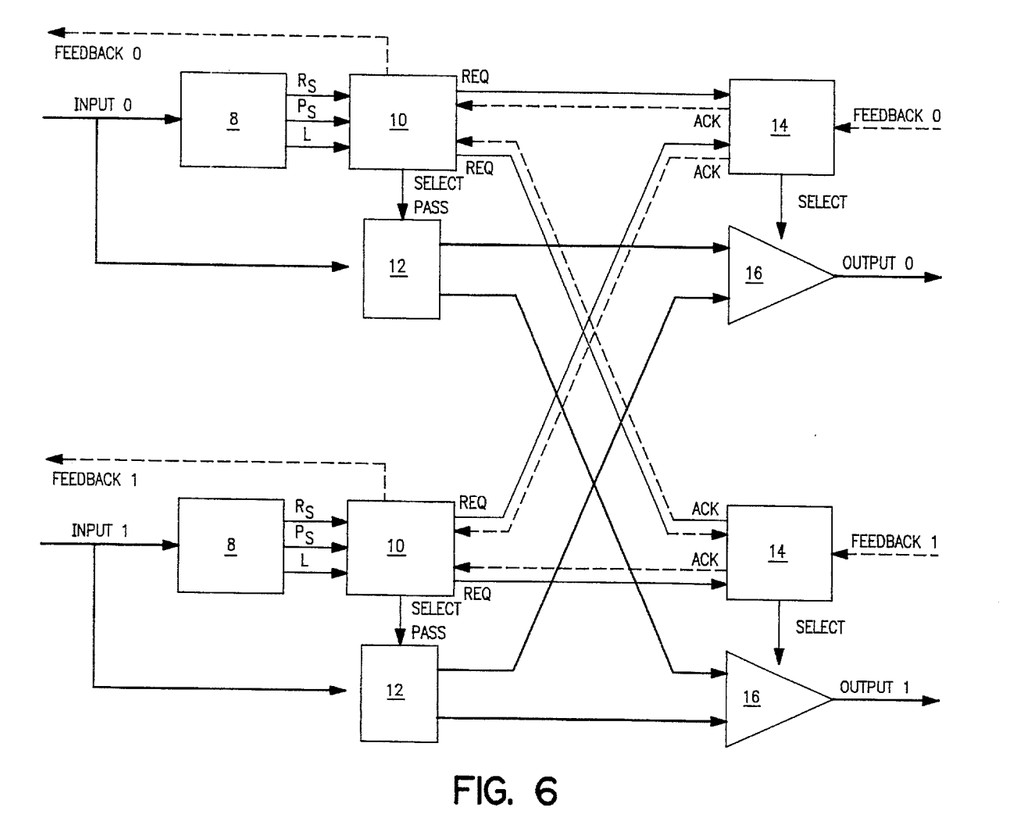
FIG. 6 is a schematic diagram in block form of a multicast switch element according to a first embodiment of the invention.

A first embodiment of the invention is illustrated in FIG. 6 as a 2×2 switch element. The two data inputs, INPUT 0 and INPUT 1, can provide outputs at OUTPUT 0 and/or 1, thus either passing a cell straight through without replication or by creating one extra copy of the cell. The multicast fabric consists of cell header decoders 8, requestors 10, cell header overwriters 12, selectors 14, and demultiplexers 16.

The circuit operates as follows. During the set-up phase, the demultiplexers 16 at each output are configured to select a cell from one of the inputs. During the data phase, the cell is transferred to the output ports and feedback information ripples back to the input port controller (not shown).

The requestor 10 receives $R_s$ and $P_s$ subfields at the head of the copy control field from decoder 8 and determines which output the cell should be sent to. This information is saved in a request register within the requestor. The requestor attempts to reserve each output that it needs by signalling a request to each of the corresponding selectors 14.

The selector 14 arbitrates between conflicting requests from different input ports for the same output. Once selected, an output port stays assigned to the same input port until all copies of the cell have been made by subsequent stages. This is indicated by the feedback signal from the following stage indicating unblocked. The selector uses round-robin arbitration to ensure fairness. After completion of a cell transmission, the input that was last selected is given lowest priority during the next set-up phase.

The remainder of the cell, including the copy control field for subsequent stages, is passed through the switch element once the data paths have been set up. The copy control fields of each of the copies of the cell that are to be fully replicated by subsequent stages are adjusted by the cell header overwriter 12 so that R=M, P=0.

The feedback signal becomes valid after the set-up phase for the entire fabric is complete. This signal ripples back from the final stage to the switch fabric input port controller. In the switch elements of the final stage (which never receive a blocked feedback input as they have no subsequent stage), each selector at the switch element outputs issues an ack signal to each of the requestors that were contending for it to indicate which was allocated to the corresponding output port.

The requestors at the switch element inputs receive an ack signal from each of the selectors in the switch element outputs and save these in a blocked register. The feedback signal from the switch element indicates blocked if any of the switch elements necessary for the cell have not yet been allocated (i.e. if any bit that is set in the request register is indicated as blocked by the blocked register).

At the preceding stage, the incoming feedback signal indicates blocked if any path on stages to its right has not yet been completed. In this case, the requestor that had successfully reserved the output will still receive a blocked indication on the corresponding ack signal from the selector. It will therefore pass on a blocked feedback signal to the stage that precedes it. If the incoming feedback signal indicates not-blocked, the selector can release the output port at the end of the current cell and participate in the next set-up phase.

A second embodiment of the invention is illustrated in more detail in FIGS. 7 to 22. This again is a 2×2 multicast switch element, as in FIG. 6, and although it shares some common features with the latter embodiment, there are also differences. For example, the copy control field of each cell contains no "L" or last-attempt flag. In this embodiment the number of unsuccessful attempts at transmission is counted at the input port. When the count decrements to zero, the switch is reset to abort cell tranmission. A further attempt at retransmission is then subsequently made in the next overall transmission cycle.

Figure 7:
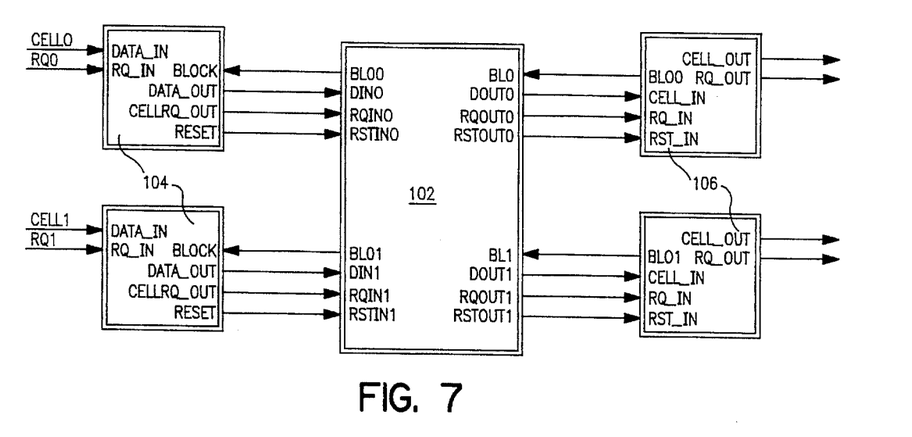
FIGS. 7 to 21 describe in more detail (down to gate level) a second embodiment of the invention.

FIG. 7 shows the multicast switch element 102 generally together with its corresponding input and output ports, 104 and 106. The circuit 102 receives cells on data input lines DIN0 and DIN1 together with a corresponding request for transmission signals on lines RQIN0 and RQIN1. Indications of whether succeeding stages are blocked are received from the output port 106 (BL0 and BL1) and these are passed back to the input ports. A blocking signal will be passed back if either (a) a blocked signal has been received from a succeeding stage or (b) if a block is created within the stage itself. The circuit 102 also receives, and transmits onwardly, a reset signal (input port 104, "RESET") in the event of a last-attempt at transmission, as described above. The reset clears any blocks for the cell whose transmission is aborted.

The input and output ports 104, 106 are not part of the multicast circuit per se and the output port 106 is essentially devoid of any circuitry, being basically a straight-through connection to its output. Although the input port is not shown in more detail, it includes an input buffer which receives the incoming cell and stores it until transmission through the multicast circuit is successful, a retry counter which generates the reset signal to abort transmission after a given number of blocked attempts, and a look-up table which appends the copy control field to the cell appropriate for the passage of the latter through the multicast circuit.

Figure 8:
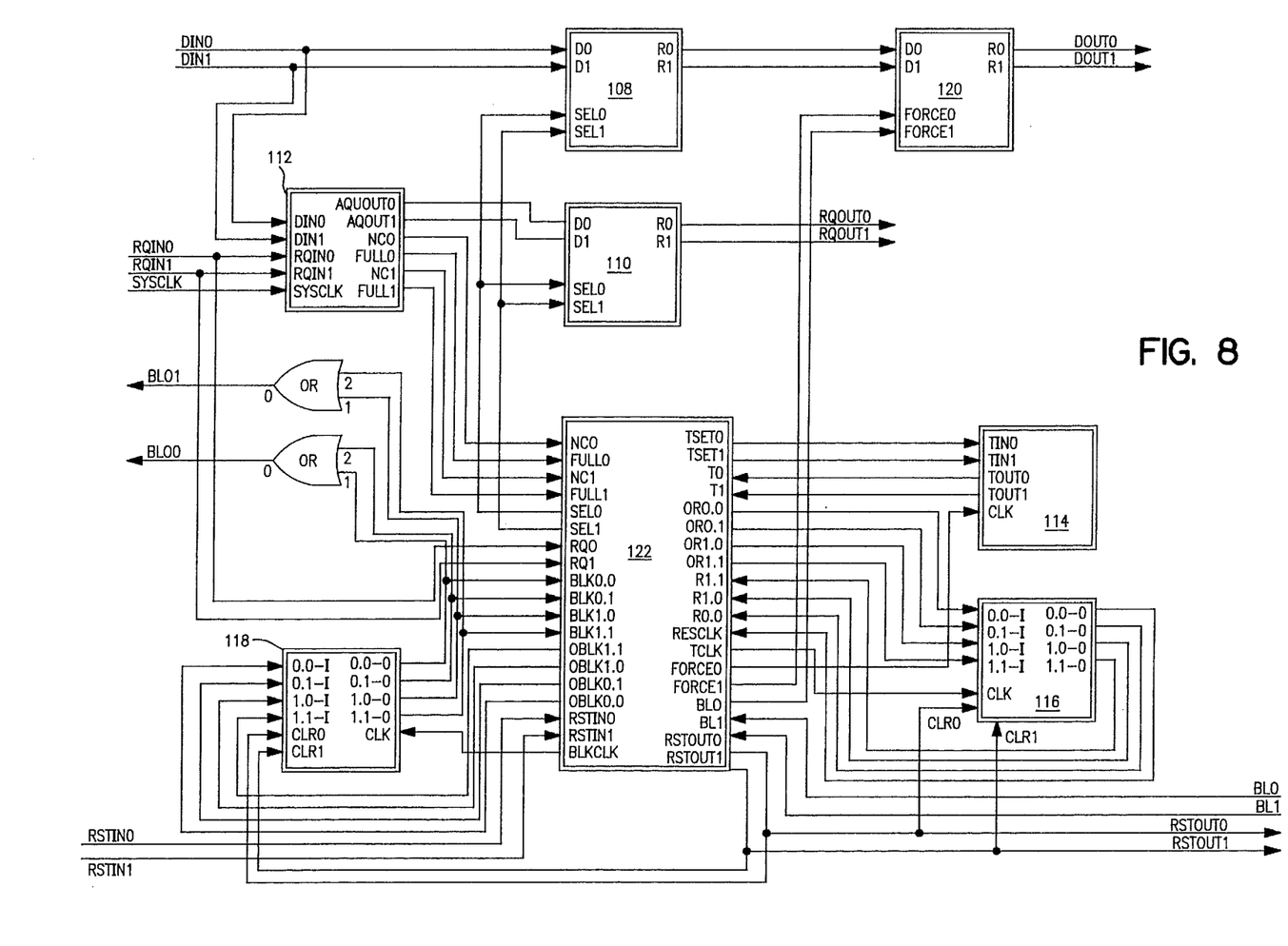

The multicast circuit 102 is shown in more detail in FIG. 8, and in succeeding FIGS. 9–21. In these Figures, where standard components are shown conventionally illustrated, these will not be explained in more detail. The switch proper which receives data on one or other of two inputs and transmits across to one or other or both of two outputs is a cross-bar switch 108. A similar cross-bar switch 110 correspondingly receives and transmits the request signals. The circuit 102 also includes a request delay circuit 112, a fairness register 114, a reservation register 116, a block register 118, a forcer 120, and an overall control circuit 122.

In this embodiment, the copy control field (CCF) of each cell is 2 bits long, one bit (NC) determining the number of copies of the cell to be replicated within the 2×2 switch and the other (FULL) dictating whether or not there is to be full replication of the cell at each subsequent stage in the multicast fabric. Thus:

| NC | FULL | |
|---|---|---|
| 0 | 0 | no copy to be made, no full replication subsequently |
| 0 | 1 | no copy, full replication subsequently, |
| 1 | 0 | 1 copy, no replication on one port, full replication on the other |
| 1 | 1 | 1 copy, full replication on both outputs subsequently. |

A feature of the present switch element is that if full replication is subsequently desired at any output, then "11" is forced into the copy control field of the transmitted outgoing cell.

Figure 9:
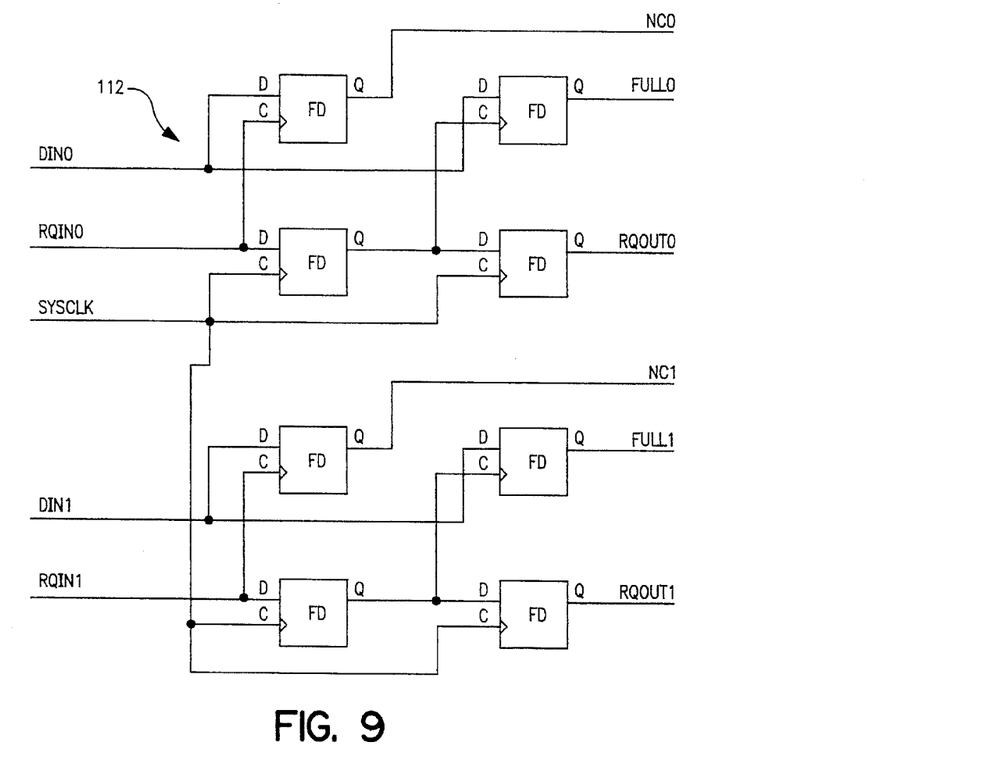

The request delay circuit 112 is shown in FIG. 9 and consists of eight D flipflops FD. The request delay circuit delays the request signal by two clock cycles so as to "strip off" the two bit CCF signal for this particular stage of the switch fabric from the cell signal. The two bit signal is latched to provide NC and FULL signals for both inputs 0 and 1 (NC0, FULL0; NC1, FULL1). Thus, with an S stage multicast fabric and assuming the 2×2 switch is the first stage (stage S) in the fabric then the CCF of the incoming cell would be $(NC_s, FULL_s; NC_{s-1}, FULL_{s-1}, \ldots NC_0, FULL_0)$.

In this example the request delay circuit would strip off $NC_s$, $FULL_s$ and store the values thereof in the appropriate latches.

Figure 10:
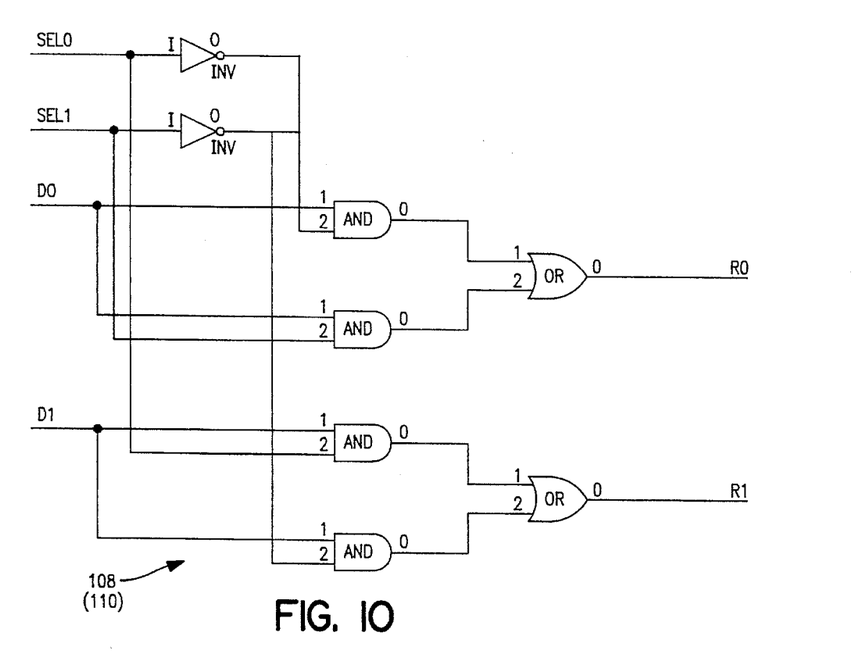

Cross-bar switches 108, 110 are shown in more detail in FIG. 10. The inputs it is desired to switch in the case of switch 108 are the cells or packets themselves (information plus CCF) whereas in the case of switch 110 it is the request signals that are switched. To whichever output port an incoming cell is switched to in switch 108, its corresponding request signal is switched similarly to the same port synchronously through switch 110. Because of the delay introduced by the request delay circuit 112, the cell is transmitted through switch 108 devoid of that part of the CCF for the stage in question. In other words, to return to the example above, $(NC_s, FULL_s)$ is lost and the CCF is clocked through as $(NC_{s-1}, FULL_{s-1}; NC_{s-2}, FULL_{s-2} \ldots)$ so that the correct two subfields of the CCF are transmitted at the front of the head of the cell for the next stage in the fabric.

Both cross-bar switches are switched in accordance with the SEL0 and SEL1 signals as follows:

| SEL0 | SEL1 | I/P O/P | |
|---|---|---|---|
| 0 | 0 | 0---->0<br>1---->1 | straight through |
| 0 | 1 | 0---->0<br>0---->1 | 2 copies of I/P 0 |
| 1 | 0 | 1---->0<br>1---->1 | 2 copies of I/P 1 |
| 1 | 1 | 0---->1<br>1---->0 | crossover |

Figure 11:
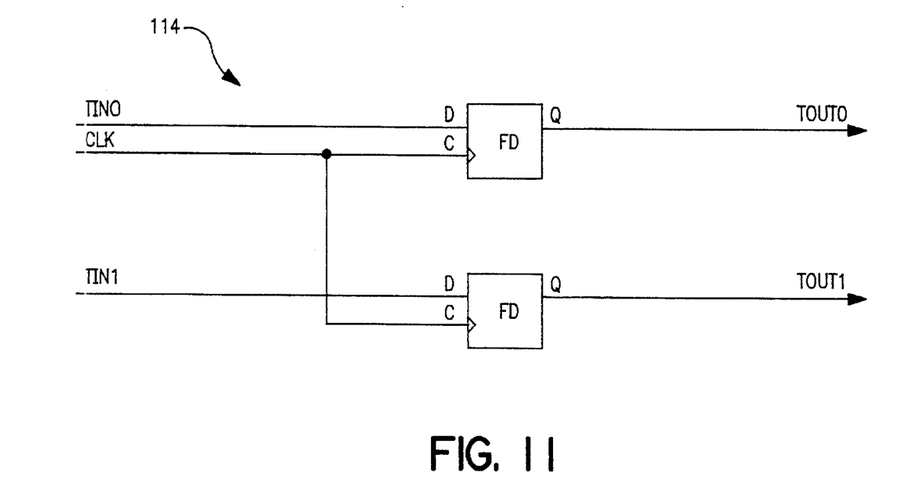

The fairness register 114 is shown in more detail in FIG. 11. This consists of a pair of D flipflops which store 1 bit per output, determined by which input used the output during the last data cycle. For example, the flipflop providing signal TOUT0 stores 0 if I/P 0 used O/P 0 last and stores 1 if I/P 1 used O/P 0 last. The result of such store is for use in any arbitration necessary to decide which input gains a particular output in the event of collision of the two incoming signals in the next set-up phase.

Figure 12:
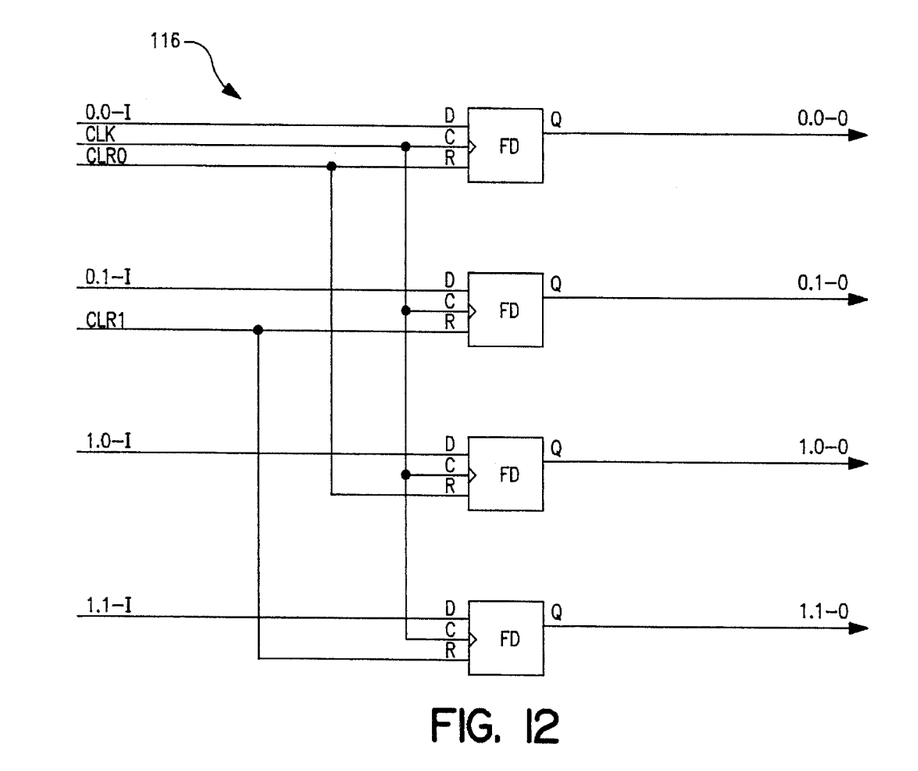

The reservation register 116 is shown in FIG. 12, and consists of 4 D flipflops. Subsequent to any arbitration made between colliding requests (see below) this stores the granted requests for the cross-bar switches. The topmost flipflop stores a signal relevant to whether or not O/P 0 can be reserved for I/P 0 (i.e. notation "0.0"). The other three flipflops similarly store requests for I/P 0–O/P 1 (0.1), etc. Each flipflop is set if, as a result of arbitration, that particular path can be granted (i.e. it blocks the path so that it cannot be granted again during the set-up phase). Each flipflop is cleared if the output is not blocked.

Figure 13:
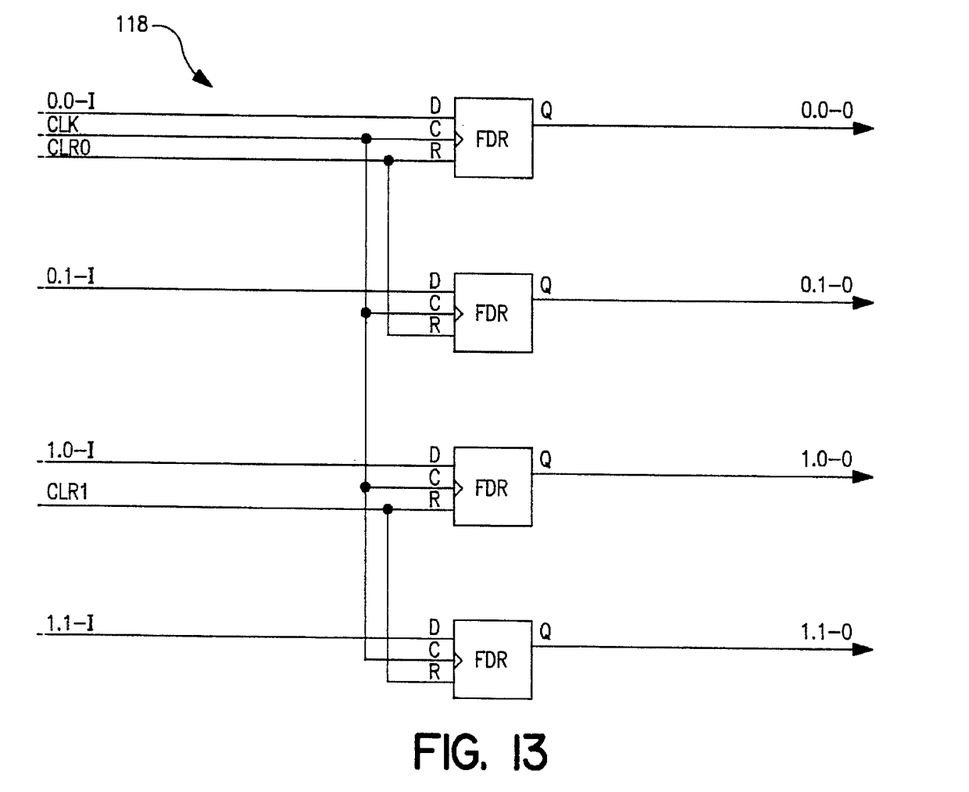

The block registers 118 are shown in FIG. 13 and are similar to the reservation registers 116. Essentially the block registers store the reverse information to that of the reservation registers: each stores for a given input, which outputs that input is blocked on. Thus, the topmost flipflop stores the information concerning whether or not I/P 0 is blocked on O/P 0 (0.0). The other flipflops have similar notation. The flip-flops are cleared on the reset line from the relevant reset signal. The latter originates from an input port in the event of a "last try attempt". Blocking is cleared, whilst the cell transmission is aborted.

Figure 14:
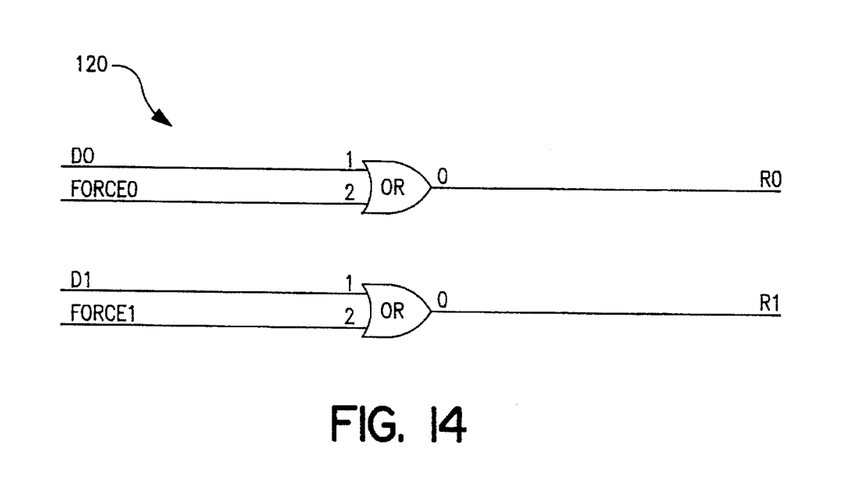

Forcer 120 is shown in FIG. 14. If, as a result of decoding the CCF, the cell is to be fully replicated in succeeding stages, the forcer overwrites NC=1, FULL=1 into the leading subfield of the CCF of the outgoing cell. The forcing signals FORCE 0 and FORCE 1 are obtained from a force signal generator within the control circuit 122 described below.

Figure 15:
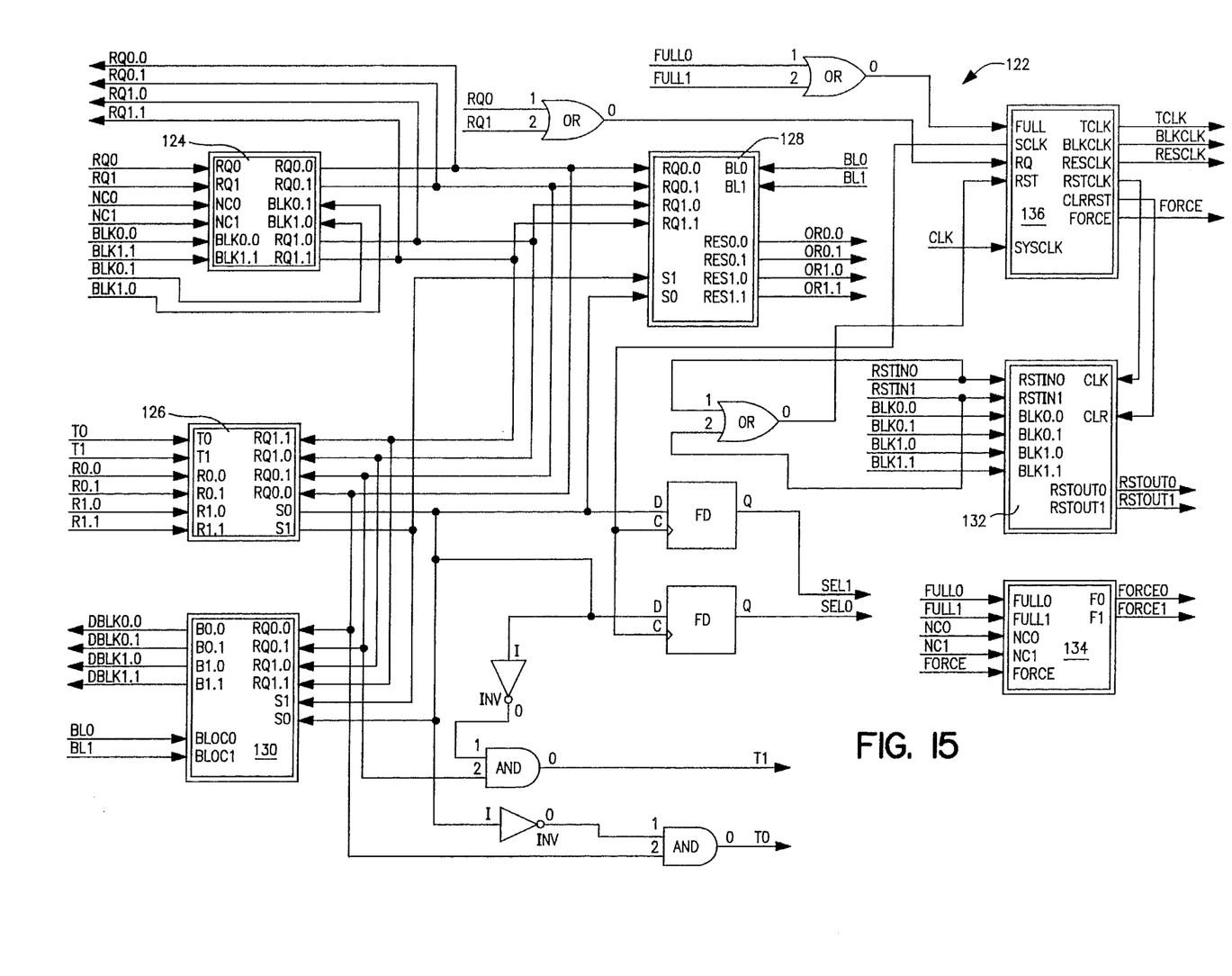

The control circuit 122 is illustrated in FIG. 15. It includes a request decoder 124, a request arbitrator 126, a reservation register controller 128, a block decoder 130, a reset signal decoder 132, a force signal generator 134, and a finite state machine circuit 136.

Figure 16:
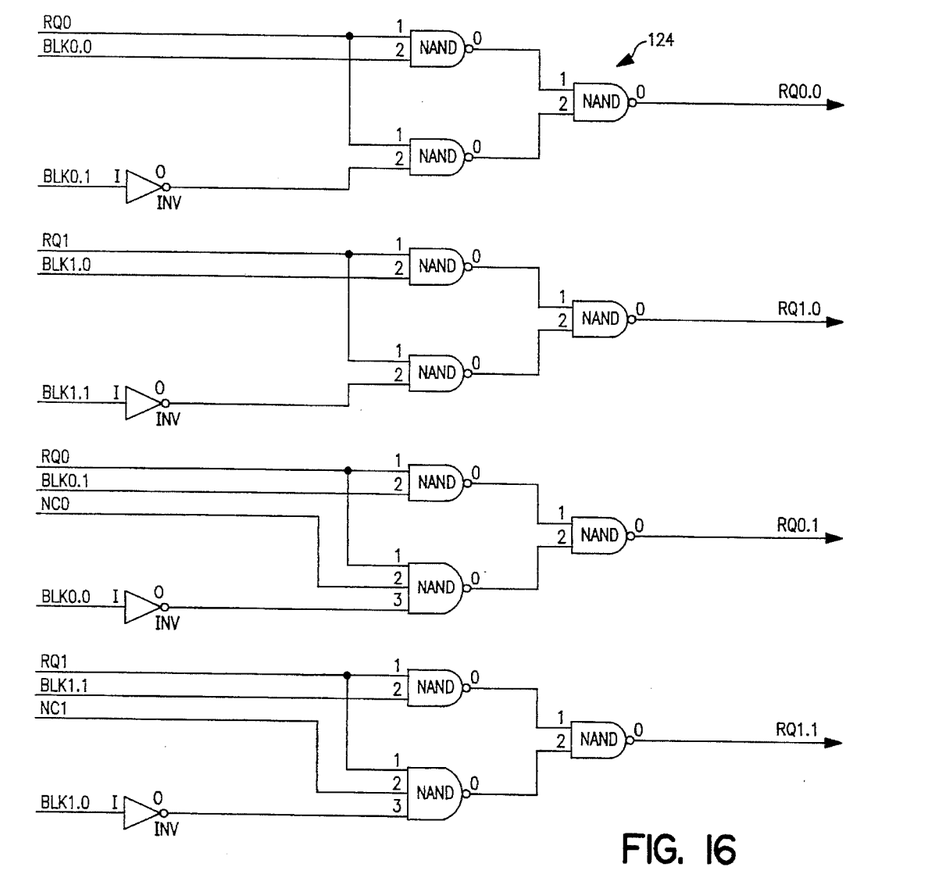

The request decoder 124 is shown in FIG. 16. This converts the request from the two input ports (RQ 0 and RQ 1) into four request signals (e.g. RQ 0.0 indicates I/P 0 is making a new request for O/P 0) depending upon which outputs the cell on a given input is to be transmitted to. If an input is previously blocked on a given output, signifying that this is a retry for this particular transmission path, a new request is not generated as it will already exist.

Figure 17:
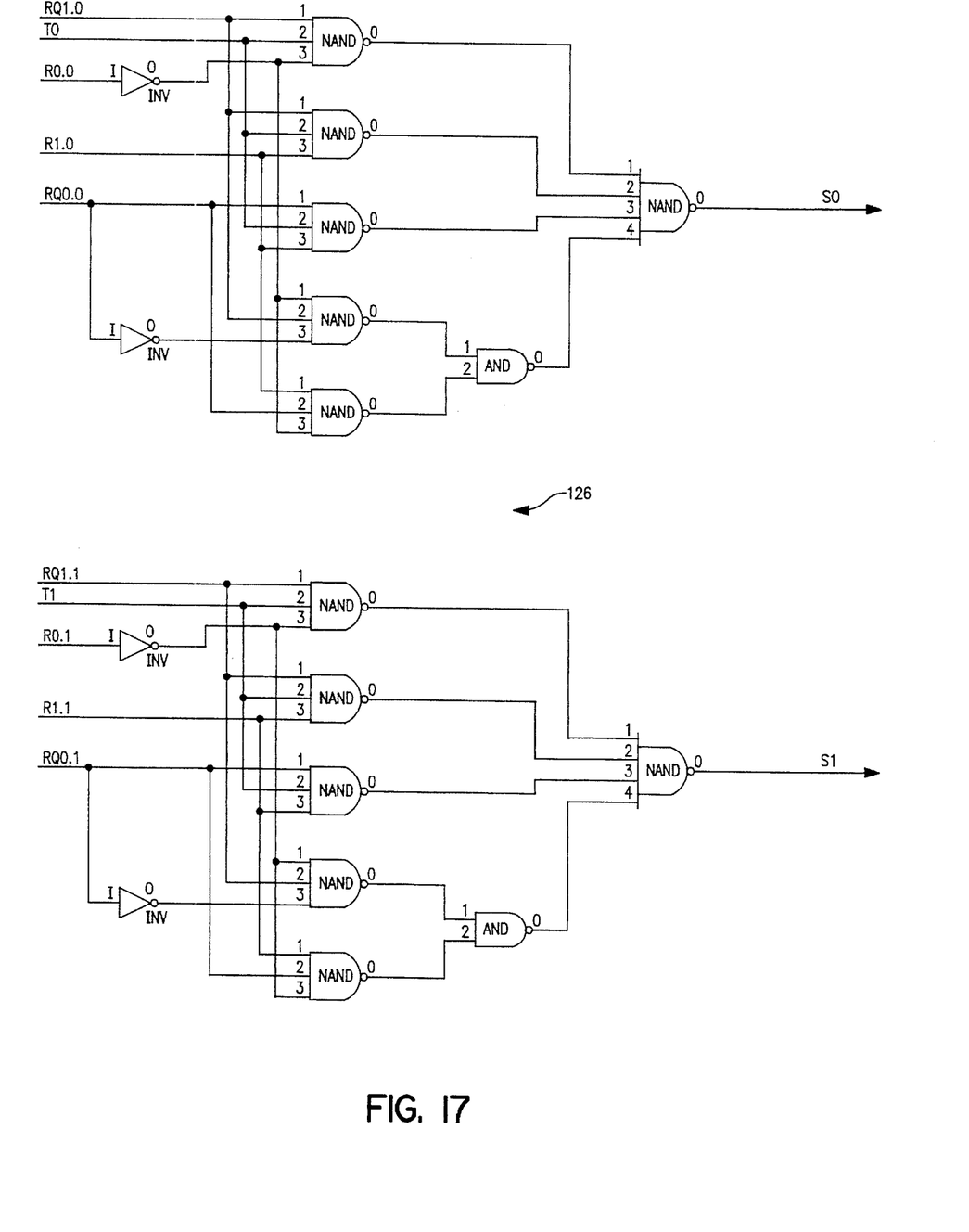
Figure 18:
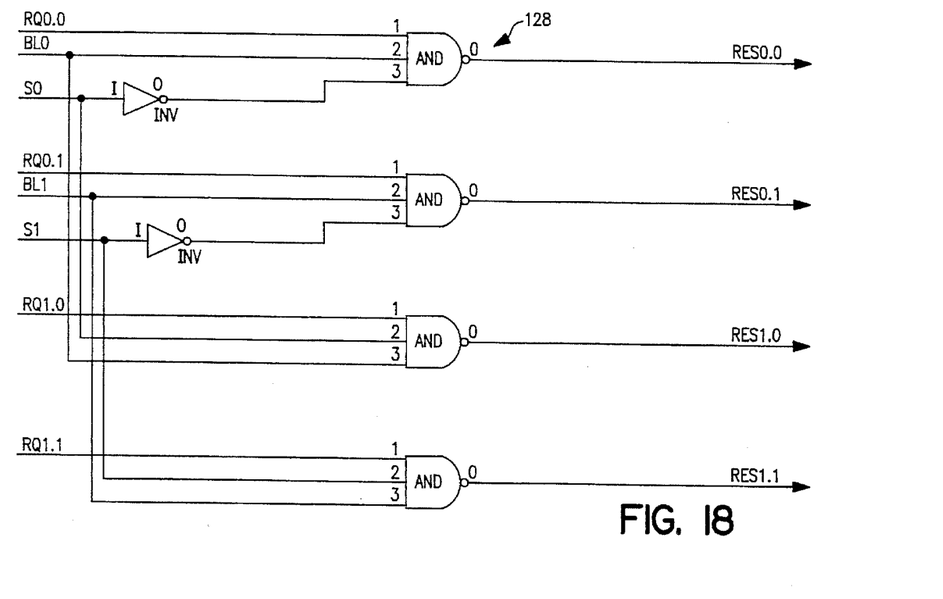

The request arbitrator 126 is illustrated in FIG. 17 and makes a decision which input should get a particular output in the event both inputs request the same output. It arbitrates based on the values stored in the fairness register 114 and, in the event of a collision, it grants signals to create the opposite request to that granted in the last transmission cycle (as stored by the fairness register 114). Thus, if I/P 0 requests O/P 0 and the reservation register 116 for O/P 0 is not set and if I/P 1 has not requested O/P 0, then I/P 0 is granted O/P 0. Output S0 is then set such that I/P 0 will be granted O/P 0. If both I/P 0 and I/P 1 request O/P 0, then which request is granted is determined by the inputs T0 and T1 from the fairness register 114. This will cause S0 to adopt a state enabling the reverse input-output path to be granted to that of the last transmission cycle. The reservation register controller 128 is shown in FIG. 18. This creates the signals to set up the reservation register 116 based upon the results of arbitration in arbitrator 126, the requests received from the request decoder 124 and blocking signals from the succeeding stages.

Figure 19:
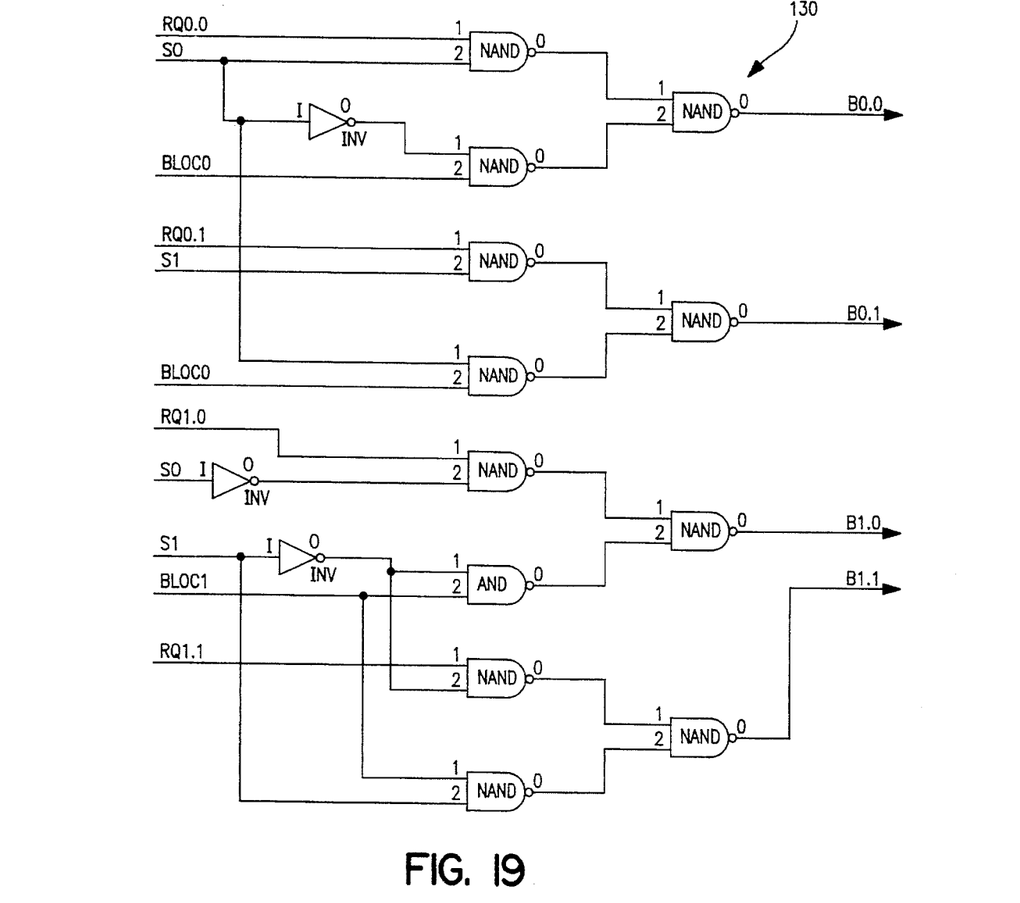

The block decoder 130 is shown in FIG. 19. This generates the blocking signals to be stored in the block register 118. It receives the requests from the request decoder 124, the result of arbitration in arbitrator 126, and the blocking signals from subsequent stages. The blocking signals (B 0.0 for I/P 0 blocked on I/P 0 etc.) can be generated in two ways. An input can be blocked on a given output if it made a request for that output (the output not being blocked by subsequent stages) but it failed arbitration and therefore the request was not granted in the stage. Alternately, an input can be blocked on a given output if it made a request for that output (this request was granted within the stage) but it was blocked by the blocking signal from subsequent stages. If an input is blocked it will retry on the next cycle.

Figure 20:
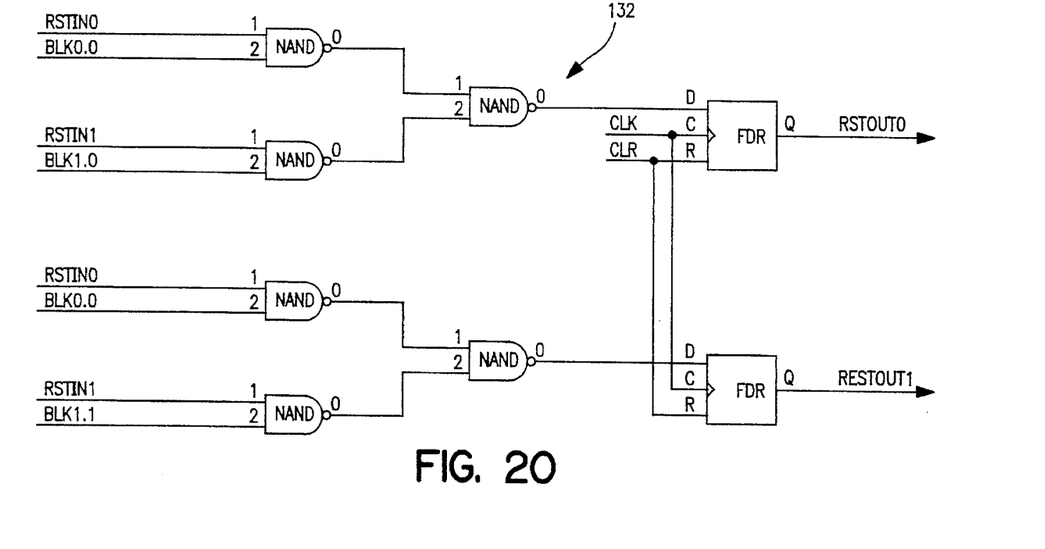

The reset signal decoder 132 is illustrated in FIG. 20. The RESET process occurs when a cell has been blocked more times than the input port 104 cares to retry. The reset signal is generated from the retry counter in the input port. The switch element uses the signals stored in the block register 118 to determine which outputs are blocked and then uses the reset signal to send the reset down the appropriate path. This clears the path in the block and reservation registers 118, 116 and also transmits the reset signal on to the next stage in the fabric.

Figure 21:
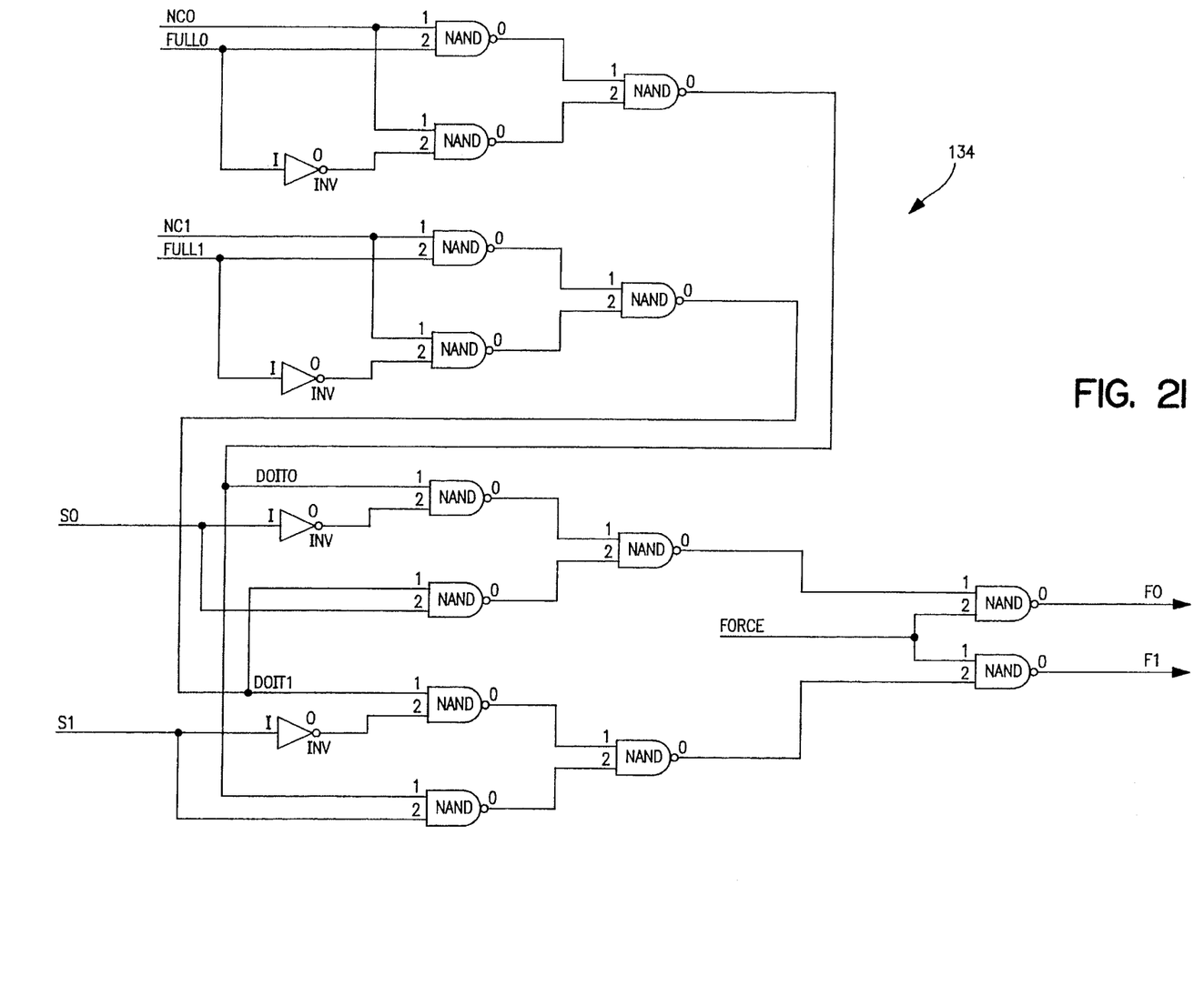

The force signal generator 134 is shown in FIG. 21 and decodes the CCF to determine whether the output CCF for the outgoing cell should be forced to 11 (i.e. full replication). It is timed by a FORCE timing signal from the finite state machine circuit 136 for the first two bits of the outgoing cell. Both are driven to "1" by forcer 120 thus giving "11" at the head of the CCF.

The finite state machine circuit 136 is not shown in more detail but consists of a pulse generating circuit to generate the various clock signals to synchronise operation of the other components.

The switch operates as follows. Assume that a multicast fabric containing a delta array of the 2×2 switches as just described is arranged in S stages, and that a cell arrives at one of the input ports of the fabric. The cell will contain header information dictating the number of cell copies required. From the look up table at the input port the appropriate copy control field consisting of S subfields NC, FULL will be prepended to the cell. The retry counter at the input port is set.

The set-up phase for the fabric now commences. The cell is passed to the first stage 2×2 switch (such as in FIGS. 8 onwards). The cell header information for this stage (stage S), i.e. $NC_s$, $FULL_s$, is stripped from the header by delay 112 (FIG. 9) and this is passed to the request decoder 124 (FIG. 16) which decodes from $NC_s$, $FULL_s$ any new requests from the two inputs for the two outputs. This information is sent to the reservation register controller 128 (FIG. 18) and thence stored in the reservation register 116 (FIG. 12). The requests for outputs are also sent to the request arbitrator 126 (FIG. 17) to determine whether or not the requests can be granted based on fairness (the fairness register 114, FIG. 11) and to the block decoder 130 (FIG. 19) so as to set up the blocks, in block register 118 (FIG. 13), bearing in mind that the block can arise within stage S or may already be stored in the register from any of the stages from earlier set-up phases (if not reset). The results of arbitration create signals S0 and S1 which are latched (centre, FIG. 15) as SEL 0 and SEL 1. The latter are the signals which actually switch the cell and request signals through crossbar switches 108, 110 respectively. The fairness register 114 is set to show the paths created by the arbitration. The cell is transferred through the crossbar switch 108. Because of the delay created by the request delay 112, the SEL 0 and SEL 1 signals arrive at the crossbar switch 108 two clock cycles late relative to the RQ (request signals) so that the first two bits of the CCF (i.e. $NC_s$, $FULL_s$) are lost and the cell passes through the switch 108 to one or both outputs with $NC_{s-1}$, $FULL_{s-1}$ at the head of the CCF. The request signals similarly pass to the same outputs in crossbar switch 110. The cell is transferred to the forcer 120 (FIG. 14) where $NC_{s-1}$, $FULL_{s-1}$ is forced to "1,1" if the CCF for stage S has indicated that there is to be full replication of the cell in each subsequent stage.

The cell and its corresponding request signals then pass to stage S-1 in the multicast fabric where the set-up phase repeats. This continues through the remaining stages of the fabric, at which time the set-up phase finishes. If at any stage the cell becomes blocked, the blocking signal ripples back through the preceding stages (and sets the block registers thereof) to the input port.

The data phase then commences and, if no blocking exists, the cell is clocked out through the multicast fabric to the appropriate output port(s). In such an event, no blocking signal is received at the input port, which will signal that there has been successful transmission through the switch fabric. The input buffer is then cleared ready to receive another incoming cell and the retry counter is set once more.

If blocking arises, this signals to the retry counter at the input port that an unsuccessful transmission took place. The retry counter decrements by 1 and commences the next set-up phase, trying to send the same unsuccessful cell again. As the fairness register 114 can "toggle" the result of arbitration by the arbitrator 126 there is a chance that this retry might be more successful. This does not always follow as the fabric will, by then, possibly be trying to set up paths for new cells that have just arrived at the fabric at this first retry set-up phase. A series of set-up and data phases follow until the cell is successfully transmitted or the retry counter decrements to 0. Once the retry counter has decremented to 0, the RESET signal is generated (reset signal decoder, FIG. 20) which ripples forward through the fabric on the next set-up phase to clear the block registers for the path for the unsuccessful cell.

I claim:

1. A multicast switch element for connection to a plurality of similar such elements in a matrix to form a multicast switch fabric, said multicast switch element having:

a plurality of inputs, each of the inputs being responsive to cells containing information and associated instructions, the instructions including a first section indicative of quantity of cell information replication to be performed by the switch element and a second section indicative of whether or not the information is to be replicated fully in any subsequent switch element in the matrix;

a plurality of outputs; and a switch coupled between said plurality of inputs and said plurality of outputs, said switch including means for decoding the first section and the second section of cell instructions received by the switch to obtain decoded instructions and for providing replicated cell information to the outputs in accordance with the decoded instructions.

2. A multicast switch element according to claim 1, comprising means for indicating at said inputs whether the switch has an ability to successfully transmit said information to the outputs in accordance with said decoded instructions.

3. A multicast switch element according to claim 2 wherein said means for indicating comprises a block register for storing information indicating blockage of a path in the switch or blockage of a path leading from an output of the multicast switch element to any subsequent switch elements to which the multicast switch element is connected in the multicast switch fabric.

4. A multicast switch element according to claim 1 wherein said means for decoding comprises means for decoding header information from each of said cells to obtain said decoded instructions.

5. A multicast switch element according to claim 4 which comprises means for removing the header information relevant to the multicast switch element from each of said cells so that each of said cells is transmitted from the multicast switch element without such removed header information.

6. A multicast switch element according to claim 5 wherein said means for removing comprises means for delaying transmission of each of said cells through the switch so that said header information is lost.

7. A multicast switch element according to claim 1 which additionally comprises means for overwriting the instructions in a cell, if the means for decoding determines from said second section of said instructions that said cell is to be fully replicated in all subsequent switch elements.

8. A multicast switch element according to claim 1 which additionally comprises a fairness register for storing successful requests for outputs in one cycle of operation of the multicast switch element and an arbitration means for determining, based upon the information stored in the fairness register, which input would be granted the output request in the next cycle of operation of the multicast switch element if there is a collision of requests for an output from more than one input.

9. A multicast switch element according to claim 1 in a form of a 2×2 switch element.

10. A multicast switch fabric having an M×M matrix of connected multicast switch elements as claimed in claim 1, an input port and an output port associated with each input and output respectively of the fabric, each said input port having an input buffer for storing a cell for transmission through the fabric, and means for retaining any such cell in said buffer until cell transmission is fully successful, or a maximum number of retries at transmission has been reached.

11. A method of replicating cells containing information and associated instructions in a multicast switch fabric having a plurality of switch elements connected in a matrix, the instructions including a first section indicative of quantity of cell information replication to be performed by the switch elements and a second section indicative of whether or not the information is to be replicated fully in any subsequent switch element in the matrix; comprising the steps, for each switch element of:

decoding the first section of said instructions in a cell entering that switch element to determine the quantity of cell information replication to be performed within that switch element;

decoding the second section of said instructions to determine whether or not the information in said cell is to be replicated fully in any subsequent switch elements which said cell subsequently enters in the multicast switch fabric;

replicating said information contained in said cell in accordance with said decoding of the first section of said instructions; and determining content of instructions included in any cell exiting that switch element, in accordance with said decoding of the second section of said instructions in said cell entering that switch element.

12. The method of claim 11 including the step of storing in each switch element information indicating blockage of a path in the switch element or blockage of a path leading from an output of the switch element to any subsequent switch elements to which the switch element is connected in the multicast switch fabric.

13. The method of claim 11 including the steps of decoding header information from each cell to obtain said instructions and removing from said each cell the header information relevant to the switch element which the cell is exiting.

14. The method of claim 11 including the step of overwriting the instructions in a cell, if it is determined from the second section of said instructions that said cell entering that switch element is to be fully replicated in all subsequent switch elements.

15. The method of claim 11 including the steps of storing successful requests for outputs in one cycle of operation of the multicast switch fabric and determining, based upon said stored successful requests, which input would be granted an output request in a next cycle of operation of the multicast switch fabric if there is a collision of request for an output for more than one input.

* * * * *